United States Patent [19]

Majthan

[11] Patent Number: 4,683,155
[45] Date of Patent: Jul. 28, 1987

[54] DOMESTIC CONTAINER WITH HANDLE ATTACHED BY GLUING

[75] Inventor: Rudolf Majthan, Eschborn, Fed. Rep. of Germany

[73] Assignee: Braun Aktiengesellschaft, Kronberg, Fed. Rep. of Germany

[21] Appl. No.: 723,994

[22] Filed: Apr. 17, 1985

[30] Foreign Application Priority Data

Apr. 21, 1984 [DE] Fed. Rep. of Germany ....... 3415120

[51] Int. Cl.$^4$ ............... B27N 5/02; B65D 23/12; A47G 19/14
[52] U.S. Cl. ............... 428/35; 215/100 A; 215/100 R; 222/465.1; 16/110.5; 16/DIG. 19; 156/276
[58] Field of Search ........... 156/330, 276; 16/110.5, 16/116 R, 119, 125, DIG. 19, DIG. 24; 222/465 A, 465 R; 215/100 A, 100 R; 428/35

[56] References Cited

U.S. PATENT DOCUMENTS

| | | | |
|---|---|---|---|
| 3,297,186 | 1/1967 | Wells | 215/100 |
| 3,393,819 | 7/1968 | Van De Walle et al. | 215/99.5 |
| 3,558,422 | 1/1971 | Hamilton et al. | 161/185 |
| 3,655,482 | 4/1972 | Schildkraut et al. | 156/276 |
| 3,919,452 | 11/1975 | Ettre et al. | 428/325 |
| 3,923,581 | 12/1975 | Payne et al. | 156/291 |
| 4,154,880 | 5/1979 | Drennan | 428/38 |
| 4,596,337 | 6/1986 | Gerald et al. | 215/100 A |

FOREIGN PATENT DOCUMENTS

| | | |
|---|---|---|
| 2090120 | 7/1982 | United Kingdom . |
| 2136273 | 9/1984 | United Kingdom ........ 215/100 A |

Primary Examiner—John E. Kittle
Assistant Examiner—Patrick S. Ryan

[57] ABSTRACT

Handle (1) attached to a domestic container (2) by means of an adhesive (3) comprises spacing strips or projections (1.2) on the edge of its contact area (1.1), said strips or projections exactly defining the layer thickness of adhesive (3) and ensuring access of ambient air to the adhesive layer through a circumferential laterally open air gap.

11 Claims, 1 Drawing Figure

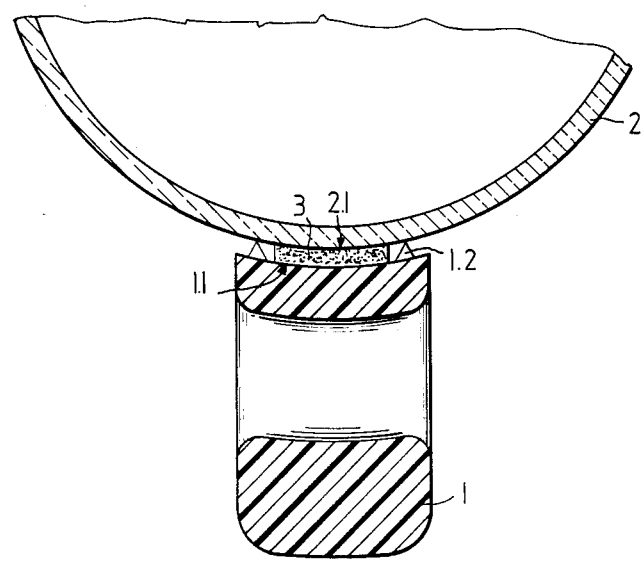

DOMESTIC CONTAINER WITH HANDLE ATTACHED BY GLUING

The present invention relates to a domestic container with a handle fastened by gluing. Containers of this kind, which can be made in particular from porcelain, glass, ceramic, metal, or plastics, are known for example in the form of glass coffee carafes from German OS No. 30 48 783. The gluing of the handle described in this patent is characterized by a relatively expensive design of the handle, especially of its contact area, which requires correspondingly complex and costly shaping tools for its manufacture. The known handles correspond to the teaching that for optimum gluing, especially when using adhesives which must react with room air and/or room humidity to cure, the contact areas must be provided with openings, through which the adhesive communicates with the room atmosphere over the entire contact area.

The goal of the present invention is to achieve a proper gluing which conforms to all strength requirements without such a complicated shaping of the handle or handle parts.

Surprisingly, this goal is achieved according to the invention by the relatively easily implementable measures according to the characterizing clause of the main claim, which are illustrated schematically in the attached drawing: spacing projections 1.2, of which preferably three or four are provided on the edge of contact area 1.1 of the handle or handle part 1, ensure not only that a precisely defined adhesive layer thickness is reliably maintained between contact area 1.1 of the handle and contact area 2.1 of the container, but also simultaneously ensure the necessary contact with the room atmosphere for adhesive 3 fully to react, since they hold open, around the adhesive layer, a circumferential air gap corresponding to their height.

At the same time, the handle design according to the invention and the gluing results achievable therewith offer the advantage of an important side effect: the open gap between handle 1 and container wall 2 can be cleaned easily at any time, both by hand and in the dishwasher, and in contrast to handles or handle parts 1 which are mounted tightly and with no spacing, no contamination which remains inaccessible to cleaning measures exists in them.

Preferably, according to the invention, three or four spacing projections 1.2 are provided especially regularly or symmetrically on the marginal area of contact area 1.1 of handle 1. In an advantageous embodiment, the contact area of the handle is approximately rectangular and has one spacing projection located in the vicinity of each of its corners. The range from 0.5 to 3 mm has been found to be advantageous for the height of spacing projections 1.2, since the most favorable curing times with simultaneously optimal adhesive action are achievable in it with the adhesives considered for use in the present application area.

Conical and pyramidal spacing projections have proven to be especially advantageous, especially from the above-mentioned contamination standpoints. In addition, an advantageous embodiment of the invention is distinguished by the fact that not the entire possible contact area 1.1 of the container handle, i.e. not the entire back of the handle facing the wall of the container, is connected by a continuous adhesive layer with container wall 2, but the adhesive engages only a part or parts of the contact area of the handle and, for example, forms roughly circular adhesive areas.

The present invention can be used advantageously on all pairs of carafe and handle materials taken into practical consideration, with the suitable types of adhesives, and primers if necessary. It can be used especially advantageously in gluing plastic handles onto glass carafes, whereby single-component silicone adhesives are preferably employed.

I claim:

1. Domestic container with a handle fastened by gluing, characterized by the fact that contact area (1.1) of handle (1) as well as contact area (2.1) of container wall (2) is smooth and closed, and by the fact that contact area (1.1) of the handle comprises formed spacing strips or projections (1.2) whose height corresponds to the thickness of adhesive layer (3), the entire periphery of said adhesive layer (3) being exposed to open air.

2. Domestic container according to claim 1, characterized by the fact that three or four spacing projections (1.2) are provided on the marginal area of contact area (1.1) of the handle.

3. Domestic container according to claim 2, characterized by the fact that contact area (1.1) of handle (1) is approximately rectangular and is provided with a spacing projection (1.2) in the vicinity of each of its corners.

4. Domestic container claim 1, characterized by the fact that the spacing projections are 0.5–3 mm high.

5. Domestic container according to one of claims 1 to 4, characterized by the fact that spacing projections (1.2) are conical or pyramidal.

6. Domestic container according to one of claims 1 to 4, characterized by the fact that the possible contact area (1.1) of the handle is greater than the actual adhesion area.

7. Domestic container according to one of claims 1 to 4, characterized by the fact that the adhesive (3) used is a single-component silicone adhesive.

8. A domestic container comprising:
    a container body that has a smooth external surface,
    a handle attached to said external surface, said handle having a smooth generally rectangular imperforate contact area and a plurality of spacer elements integral with and projecting from said handle contact area, each said spacer element being located in the vicinity of a corresponding corner of said rectangular contact area, and each said spacer element having a height in the range of 0.5–3 millimeters; and
    an adhesive layer between said contact area of said handle and said smooth external surface of said container for fastening said handle to said container, the entire periphery of said adhesive layer being exposed to open air.

9. The domestic container of claim 8 wherein each said spacer element is of conical or pyramidal configuration.

10. The domestic container of claim 8 wherein said adhesive layer is disposed in a plurality of roughly circular regions of adhesive.

11. The domestic container of claim 8 wherein said adhesive is a single component silicone adhesive; said handle is of a plastic material; and said container is of glass.

* * * * *